United States Patent [19]

Yaron

[11] 4,043,360
[45] Aug. 23, 1977

[54] PRESSURE REDUCING DEVICE FOR FLUIDS

[75] Inventor: Baruch Yaron, Givatayim, Israel

[73] Assignee: Incontrol Ltd., Tel Aviv, Israel

[21] Appl. No.: 596,455

[22] Filed: July 16, 1975

[51] Int. Cl.² ............................................. F15D 1/02
[52] U.S. Cl. ..................................................... 138/42
[58] Field of Search ..................... 138/42, 37, 40, 44, 138/45

[56] References Cited

U.S. PATENT DOCUMENTS

| | | | |
|---|---|---|---|
| 2,400,161 | 5/1946 | Mockridge et al. | 138/42 |
| 3,434,500 | 3/1969 | Burrows | 138/42 |
| 3,586,104 | 6/1971 | Hyde | 138/42 X |
| 3,692,064 | 9/1972 | Hohnerlein et al. | 138/42 |
| 3,873,030 | 3/1975 | Barragan | 138/42 X |

*Primary Examiner*—Richard E. Aegerter
*Assistant Examiner*—Willis Little
*Attorney, Agent, or Firm*—Silverman & Cass, Ltd.

[57] ABSTRACT

A pressure reducing device for fluids which comprises an elongated body the peripheral surface of which is provided with grooves along its length. The body is tightly surrounded by a sheath. The length of the body is divided into a plurality of peripheral chambers in which axially extending baffles force the fluid to flow along three forward steps and one reverse step within each chamber changing always the direction at about 90° angles.

6 Claims, 9 Drawing Figures

PRESSURE REDUCING DEVICE FOR FLUIDS

The present invention concerns a device for reducing pressure in fluids, i.e. in gases or liquids.

Many pressure reducing devices for liquids are known and are used in all phases of industry and agriculture. Particularly in the field of irrigation in agriculture, dripper units of many varied constructions are known for reducing the pressure of the water from one end of an elongated unit to the other or from the periphery of a cylindrical unit to its center or vice versa.

Thus a dripper unit is known, the which a branch pipe of very narrow diameter is wound in a helix around a supply pipe, said branch pipe receiving its water from the supply pipe. Owing to the elongated narrow conduit through which the water must pass, its pressure is considerably reduced so that it eminates from the branch pipe in a slow drip.

There is also known a button-like dripper unit, in which the water is made to flow along its top surface in grooves arranged in labyrinth-like form, so that the water must continuously change its direction, whereby its pressure is reduced greatly.

It is the object of the invention to provide a device for reducing pressure in fluids which provides in a small space a tortuous path of particular construction by which the pressure through the device is reduced to greater proportions than with a known device having similar dimensions.

This device is particularly useful as a dripper unit or in hydraulic installations.

The invention consists in a device for reducing pressure in fluids comprising an elongated body the peripheral surface of which is provided with grooves along its length terminating a both ends in an axially extending groove, said body being tightly surrounded by a sheath, characterized in that the length of the body is divided into a plurality of peripheral chambers in which axially extending baffles are provided whereby the liquid is forced to flow along three forward steps and one reverse step within each chamber changing its direction at 90° angles to create eddies before it passes from chamber to chamber.

In a preferred embodiment of the invention the baffles are so arranged that the liquid when flowing from chamber to chamber flows in a substantially spiral path.

In another preferred embodiment of the invention the baffles in the chambers are so arranged that the liquid when flowing from chamber to chamber reverses its direction by 180°.

The invention is illustrated, by way of example only, in the accompanying drawings in which.

Figure 9:
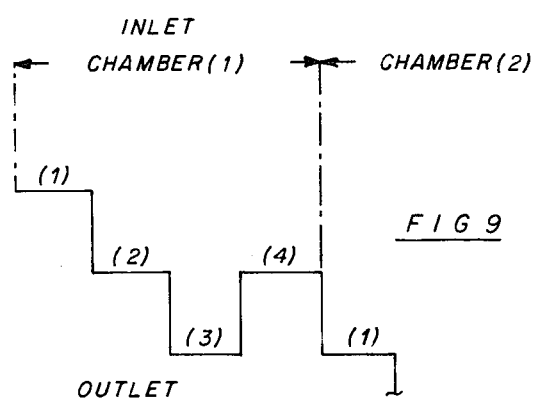

FIG. 9 schematically illustrates the flow along three forward steps and one reverse step of a chamber.

Figure 1:
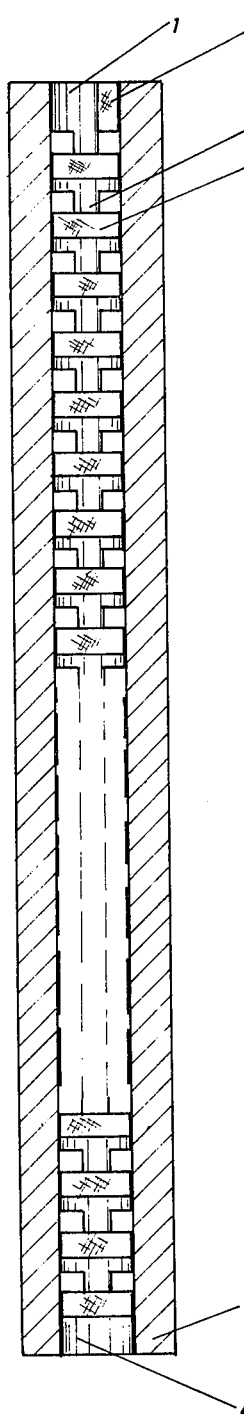
FIG. 1 shows an elevation of a pressure reducing device according to the invention, partially in section.
Figure 2:
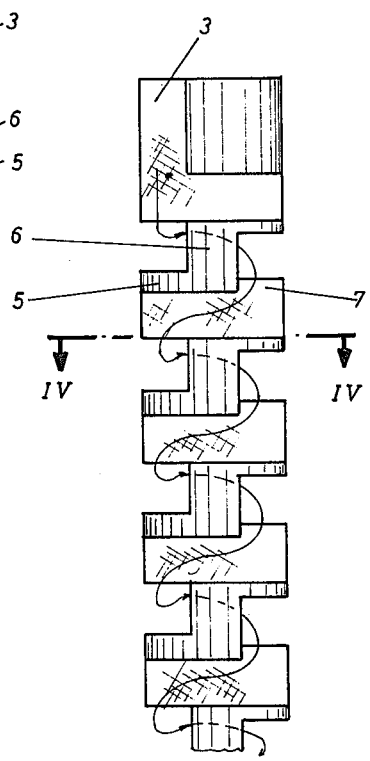
FIG. 2 shows on an enlarged scale a fragment of the device of FIG. 1 in elevation.
Figure 3:
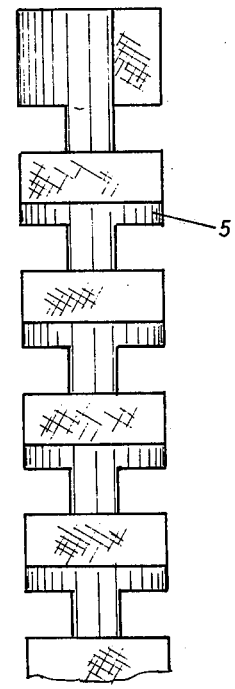
FIG. 3 shows the same 90° rotated with relation to FIG. 2.
Figure 4:
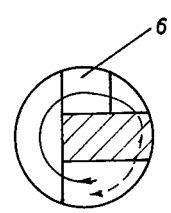
FIG. 4 is a section of FIG. 2 taken on line IV—IV of FIG. 2.
Figure 5:
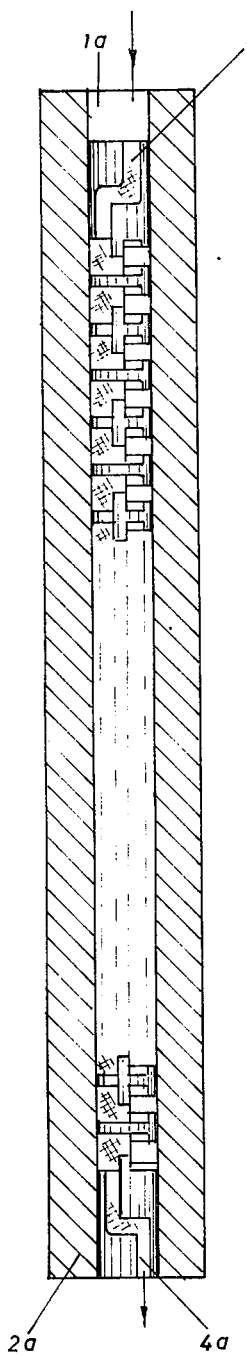
FIGS. 5-8 are views similar to those of FIGS. 1-4 of a second embodiment of the invention.
Figure 6:
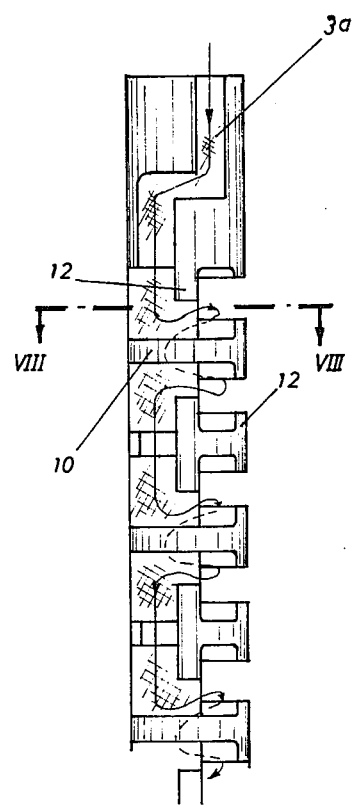
Figure 7:
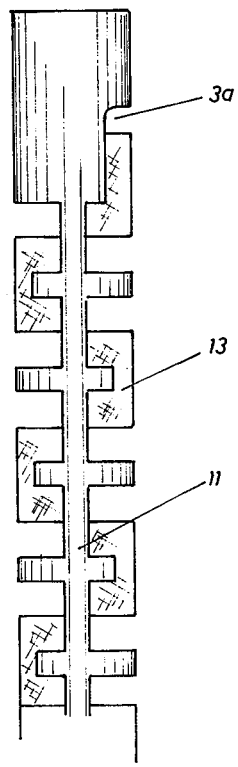
Figure 8:
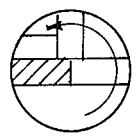

The device according to the invention comprises, as known, a cylinder body 1 of metal, plastics or the like, surrounded by a sheath 2 of a similar or a different material. An axially extending groove 3 is provided at one end of the cylinder 1 and a similar groove 4 at the other. According to the invention, the length of the cylinder 1 is divided into equal adjacent annular chambers formed about the periphery of said body, and defined by means of transversally extending baffles 5 and axially extending baffles 6. Within each chamber, the axially extending baffles 6 permit the fluid to flow freely along a baffle 5 until deflected by 90° to change direction whereby eddies are created as it passes through substantially 360° of a chamber. As seen in the drawing (FIG. 2), an opening 7 in baffle 5 permits it to flow into the next chamber. Thus in the embodiment described in FIGS. 1-4, the path of the fluid from chamber to chamber and along the entire cylinder 1 is substantially spiral in its overall form, as it flows from inlet passage 3 towards outlet passage 4, the flow in each chamber making three 90° steps and a fourth step in the reverse direction. This flow within each chamber, along three forward steps and one reverse step, as well as the flow from one chambr to the next chamber, is schematically illustrated in FIG. 9

In the embodiment of the fluid pressure reducing device shown in FIGS. 5-8, wherein a cylinder 1a is surrounded by a sheath 2a and has axial grooves 3a and 4a, at each end respectively, the length of the cylinder is again divided into chambers by transversally extending baffles 10. Axially extending baffles which merge into a continuous row 11 extend from one end of the cylinder to the other, while within each chamber short distinct axially extending baffles 12 are provided. The transverse baffles 10 hve openings 13 which lie alternatively, i.e. from chamber to chamber, on one or the other side of baffle 11. Thus, the liquid when flowing from inlet opening 3a towards outlet opening 4a is forced to change its direction by 180° as it flows from chamber to chamber since baffle 11 stops its smoothly continuous spiral flow, while, owing to baffles 12 the liquid, after it flows freely along a baffle 10 is forced to change its direction within a chamber, so that eddies are created in the corners where a baffle 11 or 12 meets the baffles 10. This reduces the pressure of the liquid greatly.

If desired, instead of cylinders 1, 1a, bodies of square, elongated or of any desirable cross-section may be provided and may be covered by sheaths of corresponding cross-sections, to form the pressure reducing device according to the invention.

The fluid pressure reducing device above described may be located at any convenient position in or on a fluid supply pipe. Thus, the fluid supply pipe may constitute the sheath of the device, the body 1,1a being inserted therein. Or the device may be inserted with one end into suitable apertures made in the wall or the end of a supply pipe. The device may also be used as connection between two parts of a supply pipe.

I claim:

1. A device for reducing pressure in a fluid flow directed in a path along the length of the device from an inlet end to an outlet end, said device comprising an elongated body, the length of said body being divided into a plurality of adjacent chambers formed about the periphery of said body, each chamber comprising a series of peripheral adjacent grooves formed in the periphery of said body transversely of the length of said body, the adjacent grooves being in communication with each other and advancing, by communicating steps, along the length of said body toward the outlet end, the grooves of each chamber, beyond a first groove closest to the inlet end, each being oriented at a propressively greater angle to the first groove about the periphery of said body with the grooves of each chamber defining a path for the flow of fluid about the periphery of the length of said body, the last groove of each chamber being closer to the inlet end than the preceding groove in the same chamber and communicating with the first groove of the next adjacent chamber toward the outlet end with said first groove of the next adjacent chamber being closer to said outlet end than said last groove of the previous chamber and at an angle thereto.

2. The device of claim 1 wherein each groove is oriented at approximately 90° to the adjacent grooves.

3. The device of claim 2 wherein each chamber comprises four grooves, said four grooves defining a fluid path extending approximately 360° about the periphery of the body.

4. The device of claim 3 wherein the third groove of each chamber generally parallels the first groove of the next adjacent chamber and the last groove of each chamber generally parallels the second groove of the same chamber.

5. The device of claim 1 wherein the last groove of each chamber is at an angle of approximately 90° to the first groove of the next adjacent chamber.

6. The device of claim 2 wherein the grooves of each chamber extend approximately 360° about the periphery of the body.

* * * * *